United States Patent [19]

Stein et al.

[11] Patent Number: 5,144,455
[45] Date of Patent: Sep. 1, 1992

[54] METHOD AND APPARATUS FOR LOCATING THE DOCUMENT REFERENCING CORNER IN A DOCUMENT SCANNER

[75] Inventors: Irene F. Stein, Fort Collins; Steven L. Webb, Loveland; David W. Boyd, Greeley, all of Colo.

[73] Assignee: Hewlett-Packard Company, Palo Alto, Calif.

[21] Appl. No.: 787,694

[22] Filed: Nov. 1, 1991

Related U.S. Application Data

[63] Continuation of Ser. No. 474,975, Feb. 5, 1990, abandoned.

[51] Int. Cl.[5] .............................................. H04N 1/04
[52] U.S. Cl. ...................................... 358/443; 358/474; 358/471
[58] Field of Search ............... 358/401, 443, 444, 445, 358/471, 446, 447, 452, 453, 461, 465, 474, 475, 488, 494, 497; 355/75; 250/578

[56] References Cited

U.S. PATENT DOCUMENTS

| | | | |
|---|---|---|---|
| 4,724,330 | 2/1988 | Tuhro | 250/208.3 |
| 4,760,463 | 7/1988 | Nonoyama et al. | 358/452 |
| 4,864,415 | 9/1989 | Beikirch et al. | 358/447 |
| 4,933,778 | 6/1990 | Tufano et al. | 358/488 |

FOREIGN PATENT DOCUMENTS

| | | |
|---|---|---|
| 60-85673 | 5/1985 | Japan . |
| 62-78963 | 4/1987 | Japan . |
| 62-219758 | 9/1987 | Japan . |

Primary Examiner—Edward L. Coles, Sr.
Assistant Examiner—Jerome Grant, II
Attorney, Agent, or Firm—William W. Cochran, II; Augustus G. Winfield

[57] ABSTRACT

A document to be scanned is corner referenced on a transparent platen, with the document's image facing down. The platen defines an X-Y coordinate system matrix. A moving line of light extends in the X direction and illuminates the document's image, line by line, as the line of light moves in the Y direction. The line of light that is thus reflected from the document is sensed by a linear CCD sensor array having a large number of individual sensor cells arranged in a line that effectively extends in the X direction. Each cell of the CCD array defines an individual pixel (PEL) within the line of light that is reflected from the document. A reflection target is located at a known position relative to the platen's referencing corner, to be scanned prior to scanning the document. Sensing of the target enables (1) the X direction physical position of the CCD sensor array relative to the referencing corner to be accurately determined, and (2) the Y direction physical position of the line of light relative to the the referencing corner to be accurately determined, both parameters being determined prior to scanning of the document.

6 Claims, 4 Drawing Sheets

METHOD AND APPARATUS FOR LOCATING THE DOCUMENT REFERENCING CORNER IN A DOCUMENT SCANNER

This is a continuation of copending Ser. No. 07/474,975 filed on Feb. 5, 1990, now abandoned.

DESCRIPTION

1. Field of the Invention

The present invention relates to document scanners, and more specifically to a method and an apparatus for electronically determining the physical position of critical scanner elements relative to a document referencing corner prior to the scanning of a document.

2. Background of the Invention

In a document scanner of the type in which the present invention finds utility, the scanner is conventionally provided with a platen whereat a document is corner referenced for scanning. The platen's referencing corner defines the X axis and the Y axis of an orthogonal coordinate system or matrix to which the picture element image content (PEL content) of the document is referenced during scanning.

The document is illuminated during scanning by a line or footprint of light that extends in the X direction and moves in the Y direction. Light is thus reflected from the document in a line by line or row by row fashion. In the case of a document comprising a black image on white paper, high intensity light is reflected from the document's white background PEL areas, and lower intensities of light are reflected from the document's black image PEL areas.

The platen may contain a horizontal, rectangular, transparent glass or glass-like member on which the document is corner referenced.

The line or footprint of reflected light is optically directed onto a linear array of light sensitive cells or elements that effectively extend in the X direction. An example of such an array is a CCD array whose individual cells define one pixel or PEL of the light footprint.

The convention that will be used in the following description defines the direction in which the light footprint extends, the direction in which the sensor array extends, and the direction in which the leading edge of the platen extends, as the X direction. The direction of relative movement between the document and the light footprint is defined as the Y direction. The sides of the platen extend in the Y direction.

It is conventional to designate the edge of the document that is positioned adjacent to the platen's leading edge as the document's leading edge. This document edge is the first portion of the document to be scanned by the light footprint. A rectangular document includes two side edges that extend in the Y direction, and that terminate at the document's trailing edge. While this is the usual configuration for a document scanner, the present invention also finds utility in scanners that are also capable of the so called backward scanning.

A scan request may be for what is defined as a window scan. A window scan requests that a rectangular area within the body of the document be scanned. The leading edge of such a window is parallel to the document's leading edge, and may or may not be coincident with the document's leading edge.

When a document corner, as defined by its leading edge and one of its side edges, is positioned at one leading edge corner of the platen, the document is said to be corner referenced on the platen.

As mentioned, the scanner apparatus can be used to either scan the entire document, or to scan an internal portion or window thereof. In the case of a request to scan a window area within the document, this window area is defined by giving the X and Y coordinates of the window area referenced to the X-Y coordinate system that is defined by the platen.

As will be apparent, the effective (i.e. magnified) X direction length of the sensor array is somewhat greater than the X direction width of the document being scanned (for example 8½ inch).

When a request is received by the scanner apparatus to scan a document, or a window within the document, the signal content of the sensor array cells is not used (i.e is not read out into memory) until the Y direction position of the light footprint has reached the leading edge of the document (or portion of the document) that is to be scanned. Also, only the length of sensor cells that actually view the document or a document window (i.e. less than all of the cells), are read out into memory.

It has been the practice in the art to accurately construct the scanner apparatus to insure that this end is achieved.

This relatively expensive method of scanner apparatus construction was assumed to provide a known positional relationship between the sensor cells, the footprint of light, and the image content of the document being scanned.

However, in these prior scanners the construction was not always performed as designated by the engineering specifications, thus leading to scan errors. Even when the scanner was constructed to the specified tight mechanical tolerances, subsequent rough handling of the scanner, and perhaps other factors such as subsequent temperature changes, caused document scanning errors to occur.

Thus, there is a need in the art for a method and an apparatus to periodically allow the mechanical position of the sensor array and the light footprint to be electrically or logically recalibrated relative to the mechanical position of other scanner components.

SUMMARY OF THE INVENTION

The present invention provides a method and an apparatus for periodically recalibrating the electronic and/or logic means of a scanner apparatus so as to ensure accurate scanning of a document, or a window within a document, without the need to rely upon a fixed and non-varying physical relationship between the sensor array, the moving footprint of light, the platen, and other portions of the scanner apparatus.

An object and an advantage of the invention is to provide a scanner apparatus wherein the mechanical construction and alignment of various scanner members and parameters, such as the optical magnification of the scanning light footprint and the position of the light path, can be constructed more easily, more economically, and to less stringent engineering specifications than was possible in the prior art.

While the prior art requires that initial construction and manufacture of the scanner apparatus accurate locate the document scanning area at a predefined physical position, the present invention provides a new and unusual construction and arrangement whereby operation of the invention accurately locates or finds the scanning area of the scanner apparatus, for example the document referencing corner of the platen. For example, the location of the referencing corner is stored in memory each time the scanner apparatus is turned on.

More specifically, the present invention provides a target area that is accurately positioned adjacent to the leading edge of the platen. This target area is scanned prior to the light footprint reaching the leading edge of the platen. Sensing the position of this target area relative to (1) the individual sensor cells of the array, and (2) the position of the light footprint as the footprint approaches the document's leading edge, allows the scanner's electronics and/or logic to be initialized so as to thereafter accurately utilize the output of certain sensor cells only when these cells are in fact reading the image data content of the document, or in the case of a windowing request, are reading the image data content of a window area that is internal to the document.

In a preferred embodiment, the invention provides a document scanner apparatus of the stationary document, moving light footprint type, wherein document scanning is accomplished by way of a movable carriage which contains a linear light source and an array of light sensitive cells that are operable to detect light that is reflected from the document.

Each sensor cell defines a document picture element or pixel (PEL) within the linear scan line that is reflected from the document. The signal content of the sensor cells are periodically read out, document line by document line, as the carriage moves along the Y direction length of platen.

The platen is provided with an opaque leading edge portion and an orthogonal opaque side edge portion, which two platen portions define a transparent leading edge corner of the platen at which a document is corner referenced for scanning.

Movement of the scan carriage is servo controlled in an open loop manner. However within the spirit and scope of the invention the scan carriage may be close loop controlled, but at an added cost. A home sensor is provided to detect the scan carriage as it moves in a homing direction, back toward the carriage's start of scan position. The home sensor is positioned within the body of the scanner apparatus, and at location that is generally related to the platen's leading edge portion. The home sensor senses the presence of the carriage when the light footprint arrives at the general location of the platen's leading edge. The inactive home position of the scan carriage is such that the light footprint illuminates the platen's leading edge portion The moving light footprint operates, for example on initial power-up of the scanner apparatus, to scan-illuminate the platen's opaque leading edge portion during the initial part of a scan operation, and before the light footprint has moved to the leading edge of the platen/document.

A reflection target is positioned within the opaque leading edge portion of platen, at a known position or distance relative to the above mentioned platen referencing corner. As the leading edge portion of the platen is scanned, the output of the sensor array is analyzed or interrogated in order to physically locate (1) the position of this reflection target relative to the individual cells of the sensor array, and (2) the position of this reflection target relative to the position of the light footprint (i.e. the position of the scan carriage, the motor that drives the carriage, the home sensor, and the footprint of light that is generated by the scan carriage, and if a closed loop servomechanism is provided, the output of the feedback transducer within the carriage motion control servomechanism).

By way of example, and without limitation thereto, upon initial power-up of the scanner apparatus at the beginning of a work day, the reflection target is scanned, scanning motion thereafter stops, and the signals derived from the reflection target are analyzed. The location of the reflection target, i.e. the location of the platen's referencing corner, is thereby stored in memory. This position parameter is thereafter used as documents are periodically scanned during the work day.

Once the position of this reflection target is known relative to other physical elements of the scanner apparatus, the position of the platen's referencing corner also becomes a known parameter.

As a result, the scanner's control logic operates to process the output signal from only certain sensor cells as these cells view the platen, or a window within the platen.

Since the physical location of this reflection target is accurately known relative to the above mentioned document referencing corner, a determination of a first group of individual sensor cells that operate to sense this target area prior to actually beginning a document scan, enables a determination to thereafter be made as to a second group of individual sensor cells that in fact will operate to sense a document, or a window within the document.

As a result of this new and unusual manner of determining the physical location of critical elements of the scanner (such as the sensor array and devices that are used to measure movement of the light footprint) relative to the X-Y coordinate system that is defined by the platen, the scanner apparatus is operated to utilize only the sensor cells that are within the above mentioned second group of cells, as a document that is corner referenced at the platen is scanned, or window scanned.

In addition, when scan carriage motion is inexpensively controlled in an open loop manner, i.e. without the use of position feedback devices, operation of the present invention uses the reflection target to locate the platen's X-Y coordinate system, and thus allows the scanner apparatus to accurate locate or find the leading edge of a document portion that is to be scanned.

An object of the present invention is to provide a method and an apparatus for periodically recalibrating a scanner apparatus so as to ensure accurate scanning of a document, or a window within a document, without the need to rely upon a fixed and predefined physical relationship between mechanical portions of the scanner apparatus.

Another object of the invention is to provide a document scanner method and apparatus for determining the relative physical location of a document platen to other mechanical portions of the scanner apparatus.

Yet a further object of the invention is to provide a method and an apparatus for initializing operation of a document scanner apparatus having a linear light sensor array, a rectangular platen at one corner of which a document is corner referenced for scanning, and a moving footprint of light to illuminate the platen and a document thereon in a line by line fashion, to thus reflect a line of light from the platen/document area to the sensor array, wherein a target means is scanned prior to scanning the document in order to enable a determination to be made as to the individual sensor cells that operate to sense this target area, thereby enabling a determination to be made as to the individual sensor cells that will in fact thereafter operate to sense a document that is corner referenced on the platen, or sense a window within the document.

While the invention is not to be limited thereto, in a preferred embodiment of the invention, operation of the document scanner is initialized, as above described, each and every time the scanner apparatus is turned on, for example at the beginning of each working day. Within the spirit and scope of the invention, host controlled program means may be also provided to initialize the sensor cell operation upon command, and perhaps others will find it useful to initialize scanner operation upon the occasion of each and every document scan request These and other objects and advantages of the invention will be apparent to those of skill in the art upon reference to the following detailed description of the invention, which description makes reference to the drawing.

DETAILED DESCRIPTION OF THE INVENTION

Figure 1:
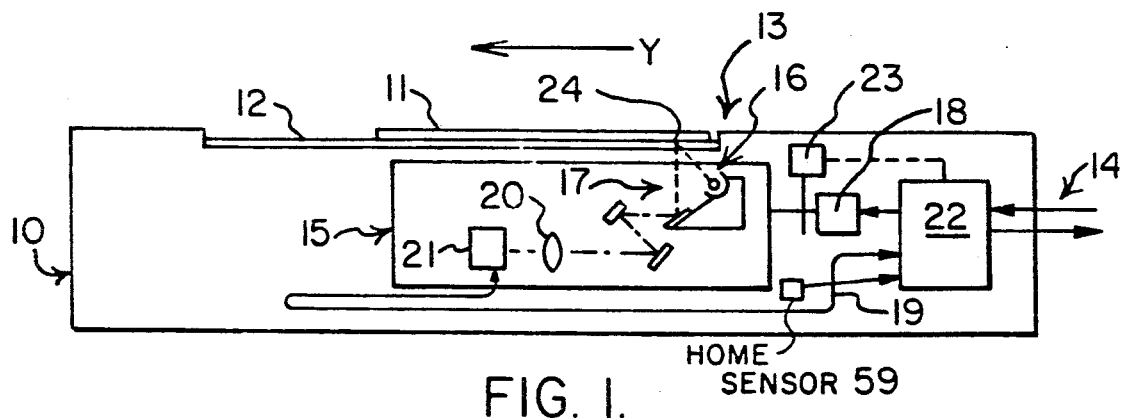
FIG. 1 is a partially schematic side view of a document scanner embodying the invention.

A document scanning apparatus 10 embodying the present invention is shown in FIG. 1. While this scanner apparatus is of the general type in which the present invention finds utility, the invention is not limited to the specific arrangement of the apparatus as disclosed.

In this scanner apparatus, a document 11 is shown positioned on transparent platen 12 with an image side facing down. The downward facing side of document 11 is scanned so as to convert the visual images contained thereon into an electronic image form that is useable by data processing machines and the like, for example host 45 of FIG. 4. Generically, scanner apparatus 10 is of the stationary document, moving light source type. However, within the spirit and scope of the invention the scanner apparatus may provide a moving document/platen and a stationary light footprint.

Document scanning is accomplished in FIG. 1 by movable carriage 15 which contains a linear light source 16 and an array 17 of reflecting mirrors. Motor 18, which preferably is a stepping motor, is mechanically coupled to carriage 15 as by gears, cables or the like. Motor 18 operates to move carriage 15 bidirectionally along the length of platen 12. Movement to the left in FIG. 1 is defined as scan movement, whereas movement to the right is defined as homing movement. The direction of this movement is defined herein as the Y direction, as is shown in FIG. 1 by an appropriately labeled arrow. The light footprint 24 that is reflected from platen 12 is redirected into lens 20, and then into light sensor means 21, best seen in FIGS. 2 and 3.

Figure 5:
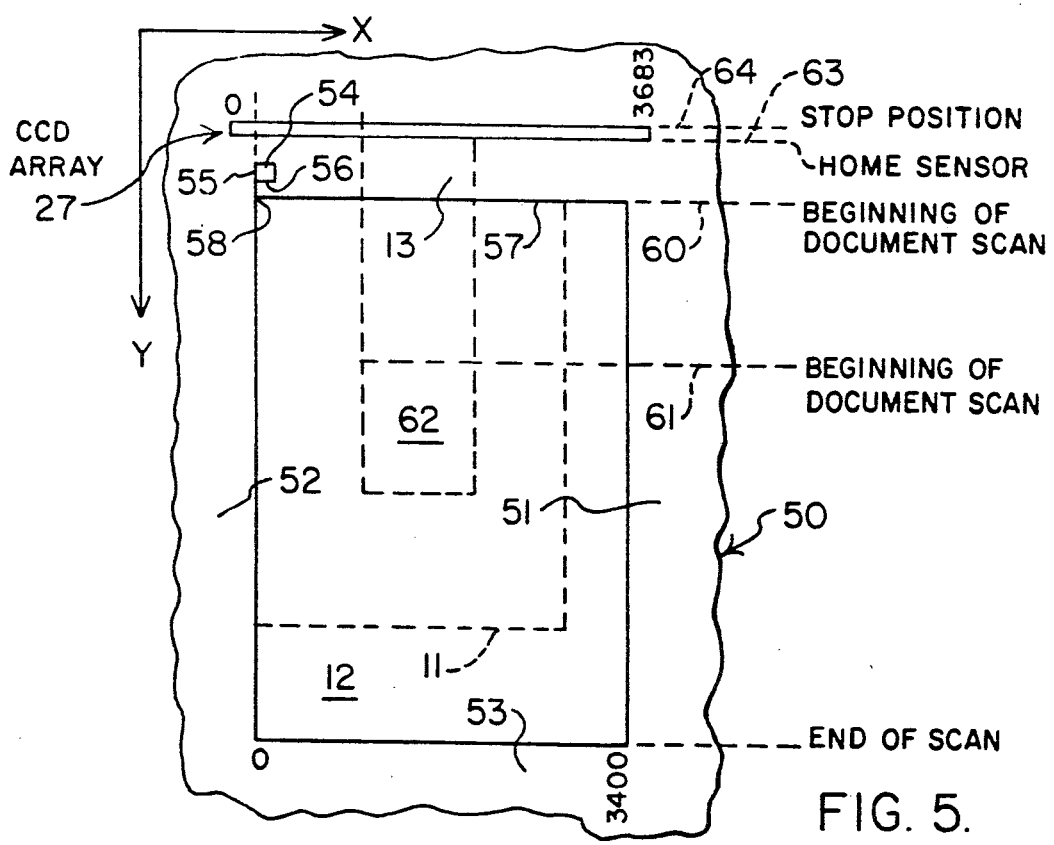
FIG. 5 is a bottom view of the document platen of FIG. 1, showing the scanner housing portions that support the platen, showing one form of target means in accordance with the invention, this target means being located on a housing portion immediately adjacent to the leading edge of the platen and to the leading edge of a document that is positioned thereon, and showing the CCD array as having a magnified effective length that is substantially equal to the length of the scanner's light footprint.

Light source 16 operates to provide a relatively thin light footprint 24 that spans the X direction or width of platen 12, so as to illuminate both the transparent portion of the platen and the opaque side edge portions of the platen, which side edge portions are defined by the scanner housing and extend in the Y direction, as is best seen in FIG. 5. The home position of carriage 15 and light footprint 24 is such that the line of light illuminates the opaque leading edge portion 13 of platen 12.

Figure 2:
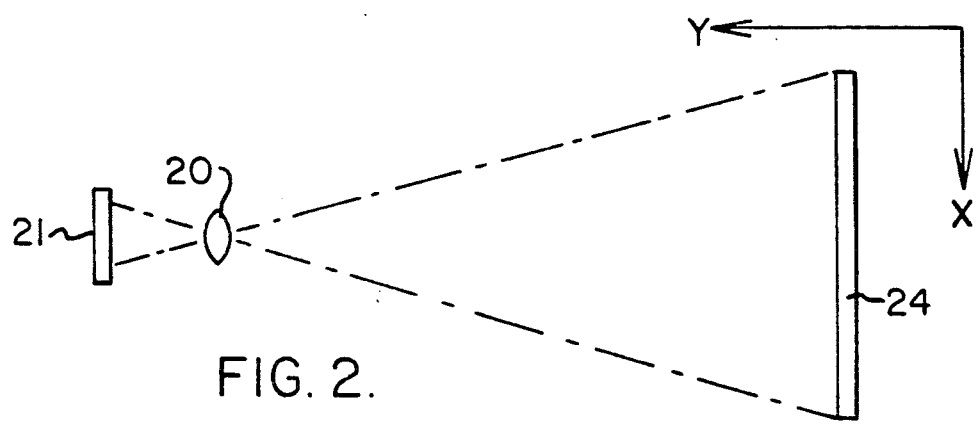
FIG. 2 is a linearized presentation of the document object plane to CCD array image plane light reflection path of the FIG. 1 scanner, and showing the manner in which the length of the CCD array is effectively magnified to be substantially equal to the length of the scanner's light footprint.

CCD array 27 is of an amplified X direction length that is substantially coincident with the length of light footprint 24, see FIG. 2. Thus, the end cells of array 27 receive light that is reflected from the opaque underside of the scanner housing adjacent to the Y direction sides of transparent platen 12, see FIG. 5.

Figure 3:
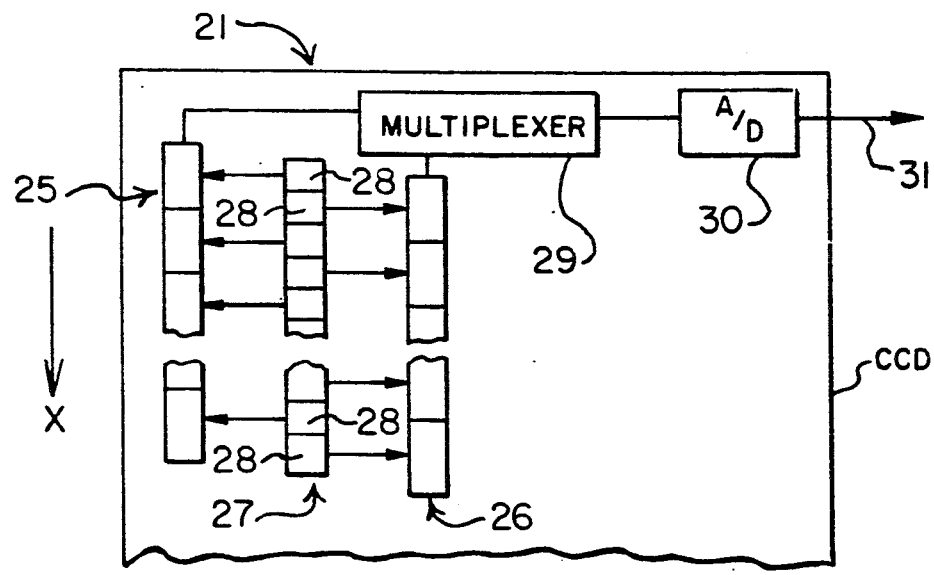
FIG. 3 is a partially broken away schematic view of the CCD sensor of FIG. 1, and of the circuitry and logic for handling and digitizing the analog signals that are provided by the individual CCD sensor cells as a result of light that is reflected to the CCD sensor.

With reference to FIG. 3, light sensor means 21 is preferably a charge coupled device (CCD) assembly or array 27 that is configured as a linear array of individual light detector cells 28. Each detector cell 28 of sensor array 27 defines a picture element or pixel (PEL) within the linear scan line that is defined by light footprint 24. CCD arrays that can distinguish a variety of PEL densities on the document (for example 400 PELS per document inch) are readily available from contemporary commercial sources and provide high quality resolution.

In FIG. 2, a typical image scan line 24 (also see FIG. 1), comprising an exemplary 3,684 X direction PEL length (the individual cells are numbered from 0 to 3,683 hereafter), is optically reduced in length as it passes through lens 20 in a predetermined ratio (eg: 7.5:1) before reaching CCD array 27. The analog signal content of light sensor means 21 is periodically read out, document line by document line, as carriage 15 moves in the Y direction along the length of platen 12.

When a document scan has been completed, carriage 15 returns to a home position (defined as homing movement movement to the right as viewed in FIG. 1) and then stops with light footprint 24 positioned upstream of the leading edge 57 (FIG. 5) of platen 12 (i.e. to the right of the position of footprint 24 as shown in FIG. 1).

The output scan signals from light sensor means 21 are coupled through flexible cable 19 (FIG. 1) to electronic controller 22, after conversion of the output signals to digital form as is described below in connection with FIG. 3. Controller 22 provides drive signals to carriage motor 18. Controller 22 operates to move carriage 15 in an open loop fashion, and receives carriage position feedback from home sensor 59 as the carriage returns to its beginning of scan position. However, within the spirit and scope of the invention, controller 22 may operate in a closed loop manner, as it receives position or movement feedback information relative to carriage 15, such as from the output of a tachometer position detector arrangement 23.

Figure 4:
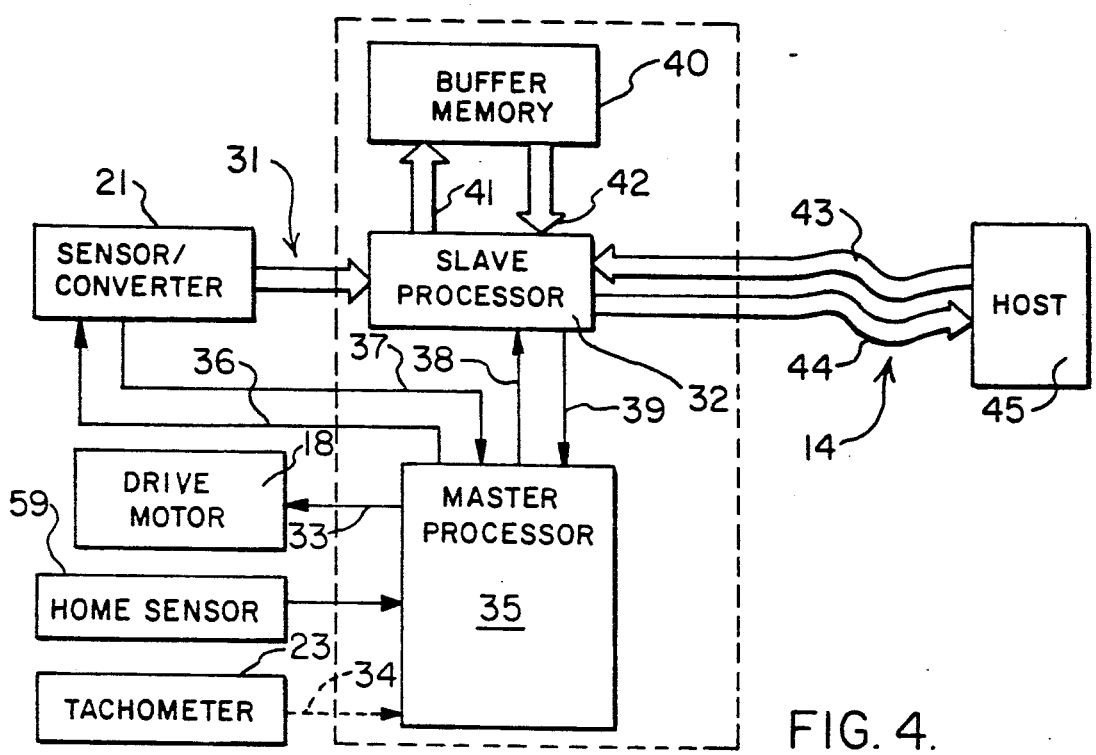
FIG. 4 is a block diagram showing the organization and arrangement of processor controlled logic and circuitry that is incorporated in the scanner of FIG. 1.

Controller 22 incorporates data processing and handling elements for exchanging data and signals with a remote host or processor 45 (see FIG. 4) by way of cable 14 (see 43,44 of FIG. 4). The operation of controller unit 22 is described in greater detail in conjunction with FIG. 4.

FIG. 3 illustrates an embodiment for reading out the data content of light sensor means 21. By means of gating signals (not shown), typically from controller 22, the analog signal content of every other detector cell 28 of CCD array 27 is coupled in parallel into analog shift register 25 while the signals present in the other, intervening cells 28 are coupled in parallel into analog shift register 26.

The analog signals loaded into registers 25 and 26 are representative of the various reflected light levels that are received from the individual PELS of light footprint 24, as these light levels are received by the like number of individual cells 28 of CCD array 27. The individual analog magnitudes correspond to the average of the light that is reflected from a small incremental pixel or PEL of light footprint 24 over a predetermined period of time. After these signals are transferred into registers 25 and 26, the signals are shifted serially through multiplexer 29 into analog to digital converter (A/D) 30. A variety of appropriate analog to digital converters are commercially available for this purpose.

Output 31 of A/D 30 comprises a sequence of bytes of data, for example, one byte of grey scale data for each PEL. Each of those bytes corresponds digitally to the magnitude of a discrete one of the analog signals retrieved from shift registers 25 and 26, and thus each byte corresponds to the magnitude of reflected light present at one of the cells 28 of CCD array 27. If array 27 images 400 cells or PELS per inch, output 31 of A/D 30 comprises a similar 400 bytes per inch.

As will be appreciated by those of skill in the art, the magnified length of array 27 (as shown in FIG. 2, the actual length of array 21 is magnified to be substantially equal to the length of light footprint 24) spans a distance that is greater than the corresponding transparent width of platen 12, as shown in FIG. 5. As a result, and as will be later described in greater detail, it is desirable for the logic and control of the scanner apparatus to be able to disregard the output of certain end cells 28 of array 27 that are not positioned so as to view light that is reflected from the transparent portion of platen 12, or from a smaller predefined internal window area within a document 11 that is positioned on platen 12.

In addition, for the majority of the cells 28 that in fact are positioned to view the transparent portion of platen 12, or to view a predefined window area within the platen, it is desirable to disregard the output of these cells until light footprint 24 reaches the leading edge of the platen, or the leading edge of the scan window.

As will be apparent, a document scanner apparatus 10 in accordance with the invention provides a platen 12 having an opaque leading edge portion 13 and an orthogonal opaque side edge portion, which two edge portions define a transparent leading edge corner of the platen (58 of FIG. 5) at which document 11 is corner referenced for scanning. Moving light footprint 24 operates to first scan-illuminate the opaque leading edge portion 13 of platen 12, and to thereafter concomitantly scan-illuminate the above mentioned opaque side edge and transparent portion thereof. As a result, during the initial portion of a scan operation, a reflected light footprint is provided to array 27 that comprises light reflected from leading edge portion 13 of platen 12.

In accordance with the invention, a reflection target (54 of FIG. 5) is positioned within this opaque leading edge portion 13, and at an exactly known position relative to the above mentioned referencing corner (58 of FIG. 5) of platen 12. As this leading edge portion 13 of platen 12 is scanned, the output of cells 28 is interrogated in order to logically locate the position of this reflection target relative to the individual cells 28 of array 27, and relative to light footprint 24 and the servo-mechanism elements that are operating to move footprint 24. Once the position of this reflection target is known, the scanner's control logic is initialized to operate, as will be described, to (1) receive the output of only those cells 28 that view the transparent portion of platen 12, or that view a predefined window within platen 12, and to (2) activate these cells to scan the document, or to scan a window within the document, only when light footprint 24 has in fact reached the leading edge of document 11, or has reached the leading edge of a window within the document.

Since the physical location of this reflection target (54 of FIG. 5) is accurately known relative to the above mentioned document referencing corner (58 of FIG. 5), a determination of a first group of individual cells 28 that operate to sense this target area prior to actually beginning a document scan, enables a determination to thereafter be made as to a second group of individual cells 28 that in fact will operate to sense a document that is corner referenced on platen 12, or will operate to sense a window within the document.

As a result of this new and unusual manner of determining the physical location of array 27 and light footprint 24 relative to platen 12, scanner apparatus 10 is initialized to operate accurately, utilizing only the cells 28 that are within the above mentioned second group of cells as a document that is corner referenced at platen 12 is scanned.

Prior to describing FIGS. 5-8 in detail, the general organization of the major electrical and electronic elements associated with the scanning of a full document or a document window will be described with reference to FIG. 4.

In a manner well known to those of skill in the art, master central processing unit (CPU) 35 controls movement of carriage 15 (FIG. 1) by way of appropriate activation signals on line 33 to motor 18 in conjunction with the output of a carriage home position sensor 59. Home sensor 59 may, for example, comprise a stationary light beam that is momentarily broken by a flag mounted on carriage 15, as the carriage moves in the homing direction toward the stop or rest position 64 shown in FIG. 5.

If desired, closed loop control of carriage motion may be provided in conjunction with a carriage position feedback signal that is provided by carriage position tachometer 23 on line 34.

In addition, master CPU 35 turns on and off the CCD cell sampling, and the analog-to-digital conversion of the cell contents of light sensor means 21, via a two-way control signal dialog that is conducted on lines 36 and 37.

The digital byte data that is provided by the output of light sensor means 21 (i.e. the output of A/D 30 of FIG. 3) is presented in parallel to slave processor 32 by way of bus 31. Processor 32 inserts the bytes of data into storage locations in buffer memory 40 by way of cable 41. Slave processor 32 receives and stores the data in response to initiating commands that are received from master CPU 35 via line 38, and continuously informs CPU 35 of its status and operation by way of line 39.

Slave processor 32 is also in two-way communication with an exemplary remotely located host data handling unit 45 via communication links 43 and 44 (14 of FIG. 1). While parallel bit, multiple line cables provide interface 43,44 between host 45 and slave processor 36, a variety of alternate data transmission disciplines are also available for this purpose, including means such as modems, fiber optic communications, etc.

Buffer memory 40 may comprise a table having a sequence of data storage locations. Typically, but without limitation thereto, memory 40 does not provide enough data storage to hold all of the data that is derived from scanning all of document 11, or of a relatively large window within the document.

As a byte of data is received from light sensor means 21 over cable 31 (19 of FIG. 1), the data is inserted into the next available sequential storage location within buffer memory 40. When host 45 notifies slave processor 32 that it is ready to receive data, processor 32 begins transmitting the data then resident in memory 40 to host 45 over link 44. Processor 32 concurrently handles the entry of data into memory 40 from cable 31 and the transmission of data from memory 40 to host 45. The transmission of data to and from memory 40 is such that memory 40 is loaded and unloaded on a recycling first in, first out (FIFO) basis. Typically, processor 32 is loading data in an upstream storage location of memory 40 at the same time that data is being extracted from a downstream memory location for transfer to host 45.

As long as host 45 operates to request data from processor 36 as fast as, or no faster than, data is inserted into memory 40, the system proceeds smoothly until data corresponding to the entire document or document window has been scanned and transmitted.

Processor 32 notifies CPU 35 whenever host 45 fails to request data from memory 40 fast enough to prevent the last available storage location of memory 40 from becoming loaded with data, i.e. a memory-full condition.

When this memory-full condition is indicated by processor 32, CPU 35 notes the location of carriage 15 and line of light 24 at which the memory-full event occurred, and CPU 35 operates to stop drive motor 18. CPU 35 now reverses drive motor 18, and returns carriage 15 to a position that is upstream of the noted memory-full location. Carriage 15 remains at this upstream position until host 45 again begins to request data from memory 40.

When CPU 35 determines that processor 32 can again load data into memory 40, scan movement is reinitiated. In each case of a memory-full start/stop sequence the upstream stop position is selected such that carriage 15 will be at full scan velocity as it again reaches the downstream memory-full position, whereupon document scanning is reinitiated, under the control of line 36.

The above described stop/start scan sequence repeats each time that a memory-full condition is detected for memory 40. Eventually, the complete data content of document 11, or of a window within the document, will be loaded into memory 40, and will be transferred over communication link 44 to host 45.

With reference to FIG. 5, when the scanner apparatus is not in use, carriage 15 is parked at a stop position that is defined by reference numeral 64. When a scan request is received, motor 18 is driven in the Y direction (to the left as seen in FIG. 1) at a low velocity. The first event to occur is that home sensor 59 (FIG. 1) detects that carriage 15 has arrived at a position that is defined by reference numeral 63 in FIG. 5. As a result, motor 18 is controlled to momentarily stop carriage 15 at a position corresponding to 63.

Stop position 63 is not well defined relative to the physical position of target 54. This is due to the inexact and variable physical relationship that exists between sensor 59 and target 54, as is evident from viewing FIG. 1 and as will be appreciated by those skilled in the art. The Y direction distance between home position 63 and the location of target 54 is quite small.

Figure 7:
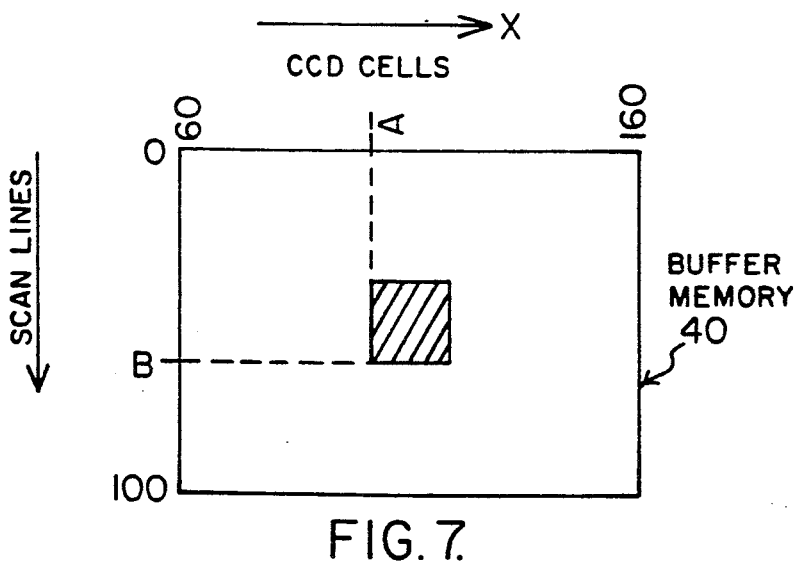
FIG. 7 shows a representative data content or PEL map that is stored in the buffer memory of FIG. 4 as a result of scanning the target means of FIG. 6, and FIG. 8 discloses a method embodiment of the invention in flow chart form.

Motor 18 now begins a document scan operation. Early in this scan movement, target 54 is encountered. As a result of scanning target area 54, a PEL map such as is shown in FIG. 7 is loaded into memory 40.

FIG. 5 is a bottom view of document platen 12 shown in FIG. 1. As is seen in this figure, transparent platen 12 is rectangular in shape, and is edge-supported or mounted by an encircling opaque scanner housing 50. The support portions of this housing comprise the above mentioned leading edge portion 13, two orthogonal side edge portions 51 and 52, and a trailing edge portion 53.

In a preferred embodiment of the invention, but without limitation thereto, leading edge portion 13 is colored white (i.e. highly reflective) and supports or mounts a 20 PEL by 20 PEL black target means 54 having an X direction edge 55 and a Y direction edge 56. In an alternative embodiment the invention, target area 54 may comprise a hole or a recess that is formed in housing/platen leading edge portion 13 so as to appear black to the scanner's optical system.

Target means 54 is located on housing portion 13 closely adjacent to the leading edge 57 of platen 12 (the exact distance is not critical), this leading edge 57 being coincident with the leading edge of a document 11, shown in broken lines.

During manufacture of the platen portion of the scanner apparatus, target edges 55 and 56 are accurately located or positioned relative to the X-Y coordinate system that is defined by the platen's document referencing corner 58. Platen corner 58 is considered to be the $X=0, Y=0$ PEL area of this coordinate system. The rows of this coordinate system extend in the X direction, each row being coincident with a document scan line. The columns of this coordinate system extend in the Y direction and each column is coincident with sensor one cell 28 of CCD array 27. An exemplary scan resolution is 400 rows per Y direction inch and 400 columns per X direction inch.

In a preferred embodiment of the invention the X direction width of platen 12 was about 283.5 centimeters (cm) (about 8 ⅜ inch), and the Y direction length of platen 12 was about 392.8 cm (about 14 ⅛ inch).

Note that in FIG. 5 the effective X direction length of CCD array 27 is somewhat longer that the width of platen 12. In practice, array 27 is physically quite short, and the longer effective length shown in FIG. 5 is established by the optical system shown in FIGS. 1 and 2. Also note that in FIG. 5 CCD array is defined as having 3,684 individual sensor cells, designated from cell 0 to cell 3,683. In this figure CCD array 27 and light footprint 24 are synonymous, and are shown positioned at stop position 64 that is upstream of the home position 63 of these two scanner elements (remember that light footprint 24 moves and is optically imaged upon stationary CCD array 27).

The resolution of CCD array 27 is of an exemplary 400 PELS or cells (i.e. cells 28 of FIG. 3) per inch. Thus the row by row scanning of an entire 8 ½ inch wide document 11 will utilize only 3,400 of the 3,634 array cells. The scanning of a window 62 within the body of document 11 will utilize a smaller number of cells 28. Operation of the invention provides an accurate determination of just which cells to use in either case.

FIG. 5 shows two Y direction beginning of scan positions defined as 60 and 61, position 60 of which is used for the scanning of an entire document 11, or for the scanning of a window (not shown) within document 11 whose leading edge is coincident with the document's leading edge, and position 61 which is used for the scanning of a predefined window 62 within document 11.

The position of the PEL areas of document 11 to be scanned, or of a window 62 within document 11, are all referenced to the X-Y coordinate system that is established by platen referencing corner 58.

The new and unusual concept of the present invention utilizes the unitary construction of platen leading edge portion 13 of the scanner housing to form both corner reference 58 for document 11 and to form the target means 54 whereby the physical location of corner 58 may be accurately determined or initialized relative to other more remotely located operative elements of the scanner 10, such as sensor array 21 and home sensor 59.

Since the position of target means 54 is accurately known relative to referencing corner 58, the sensing of target means 54 during the initial portion of a document scan is utilized to provide for activation of CCD array 27, both in the X and the Y direction, so as to accurately scan document 11, or to accurately scan a window area 62 within document 11.

As the leading edge portion 13 of platen 12 is scanned, the output of sensor cells 28 are interrogated in order to (1) locate the physical position of reflection target 54 relative to the individual cells 28 of array 27, and (2) locate the physical position of reflection target 54 relative to the movement of motor 18 beyond home sensor 59 and home position 63. Once the position of reflection target 54 is known, the scanner's control logic operates to (1) receive the output of only those sensor cells 28 that view the transparent portion of platen 12, or of a smaller window within the platen, and to (2) activate these cells to scan document 11, or a window within document 11, only when light footprint 24 has in fact reached the leading edge of document 11, or the window within the document.

Since the physical location of reflection target 54 is accurately known relative to document referencing corner 58, a determination of a first small group of individual cells 28 that operate to sense target area 54 prior to actually beginning a document or window scan, enables a determination to thereafter be made as to a second group of individual cells 28 that in fact will operate to sense document 11 that is corner referenced on platen 12, or to sense a window 62 within document 11.

As a result of this new and unusual manner of determining the physical location of the X-Y coordinate system as is defined by platen 12, scanner apparatus 10 is operated to (1) accurately utilize only the cells 28 that are within the above mentioned second group of cells as a document that is corner referenced at platen 12 is scanned, and to (2) begin using these cells when light footprint 24 is coincident with the leading edge of the document area that is to be scanned.

Figure 6:
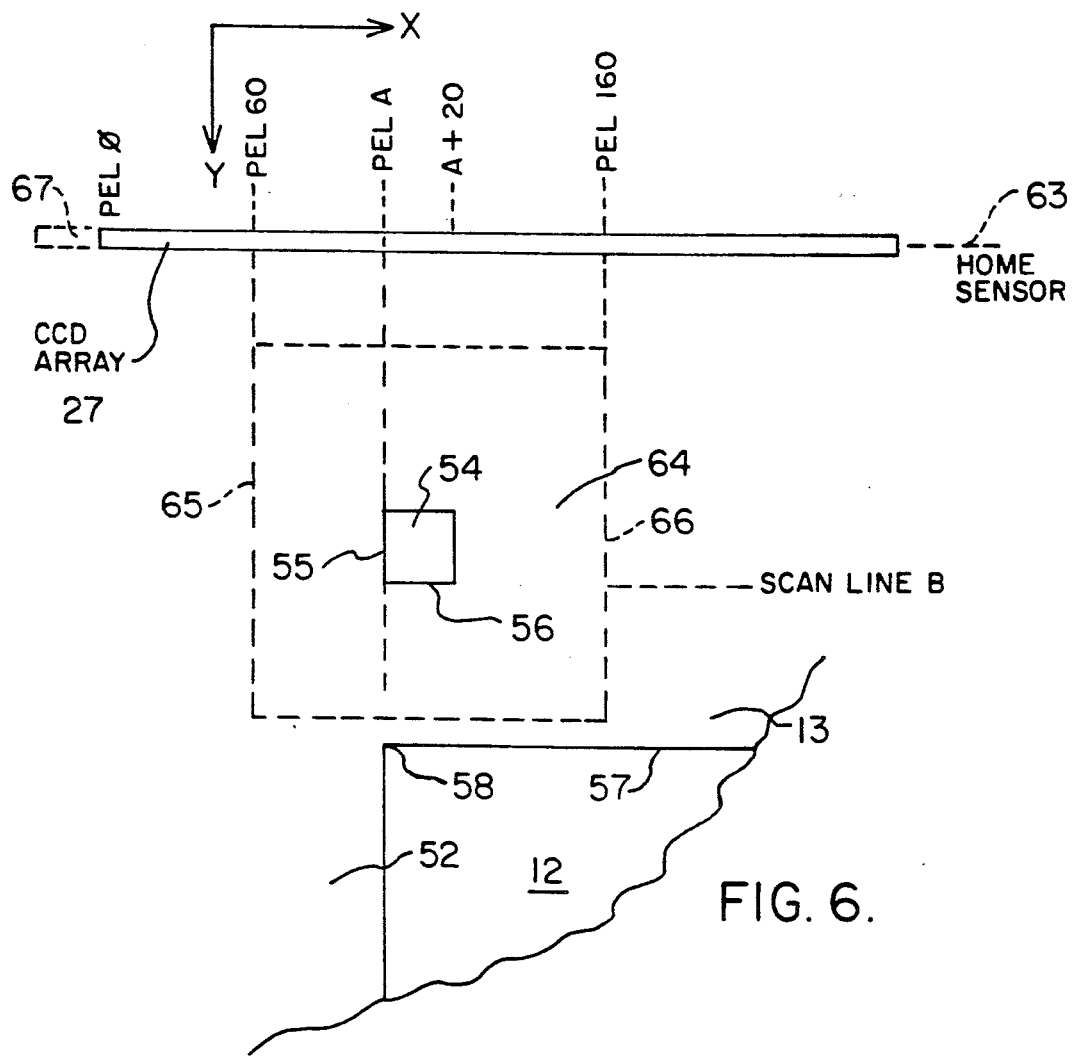
FIG. 6 is an enlarged view similar to FIG. 5, showing the target means and the referencing corner of the platen.

FIG. 6 is an enlarged view that is similar to FIG. 5, showing target means 54, showing the platen's document referencing corner 58, showing CCD array momentarily stopped at the home position defined as 63 in FIG. 5, and showing two different and exemplary X direction positions of CCD array 27 relative to corner 58.

Square dotted outline 64 is an exemplary 100 × 100 PEL area of the platen's leading edge portion 13 that includes the 20 × 20 PEL area occupied by target 54. The image content of PEL area 64 will be stored in memory 40 of FIG. 4 as leading edge area 13 is scanned. FIG. 7 shows the stored PEL map content of memory 40 which results from scanning area 64. Within the spirit and scope of the invention, any PEL size area 64 of the platen's leading edge portion 13 can be scanned and stored, just so long as the scanned area includes target 54.

While it is not critical to the invention, Y direction target edge 55 of FIG. 6 is positioned in exact mechanical alignment with the left hand edge of the transparent portion of platen 12 (the right hand and left hand directions are referenced to viewing platen 12, FIG. 1, from below).

The first X direction position of CCD array 27 to be considered is shown in solid line in FIG. 6. In this position of the CCD array, a sensor cell identified as PEL 60 scans the left hand edge 65 of area 64, as sensor PEL 160 senses the right hand edge 66 of area 64. In this position of the CCD array, the scanning of target 54 results in data being stored in memory 40 as is shown in FIG. 7. This stored data is used to make a determination that sensor PEL A is the sensor cell that is positioned to be substantially coincident with Y direction target edge 55.

As a result of the determination that PEL A is in substantial alignment with this platen side edge during scanning of document 11, the cells of array 27 that are used to perform a full document scan begin at cell A and end at cell A+3400. Of course, during a window scan of document 11 the array cells to be used are determined with reference to the fact that cell A views the left hand edge of the platen.

The dotted line position 67 of sensor array 27 assumes that a shift to the left has occurred in scanner components, as may have been caused by a temperature change or perhaps by a mechanical blow to the scanner. Or perhaps the scanner was originally manufactured without optimum alignment being achieved due to the fact that the tolerances for optimum alignment were too difficult to achieve. The effective position of array 27 has now shifted to the left by an assumed distance equal to 20 PELS. For this assumed condition, the sensor cell that is identified as PEL A+20 will be in substantial alignment with the left hand edge 55 of target 54 and with the left hand edge of platen 12. This determination results in the identification of the sensor cells to be used for a full document scan as the cells beginning with cell A+20, and ending with the cell A+20+3400.

In addition to functioning as above described, the FIG. 7 PEL map content of memory 40 is used to accurately determine when light footprint 24 reaches the leading edge of the document area to be scanned, be it a full page document scan, or be it the scan of a small window within the body of the document.

This function is accomplished in a similar manner. However in this case the content of memory 40 (FIG. 7) is used to determine that the scan line identified as B in FIG. 7 is the scan line that is in substantial alignment with the trailing X direction edge 56 of target area 54 (this PEL row is identified as B in memory 40 of FIG. 7). Since the position of target edge 54 is accurately known relative to the leading edge 57 of platen 12, continued scan movement of motor 18 (movement to the left in FIG. 1) is monitored, as by counting the movement steps of stepping motor 18. When it is determined that light footprint 24 has arrived at the leading edge of the document area to be scanned, array 27 is activated to begin loading memory 40 with the image data content of this document area.

During the scanning of a document, the content of buffer memory 40 is transmitted to host 45. However, and without limitation thereto, during initialization of the scanner apparatus in accordance with the invention, the FIG. 7 content of buffer memory 40 is preferable maintained within the electronics of the scanner apparatus itself.

During the scanning of a document, the output 31 (FIG. 4) of sensor/converter 21 may comprise many binary magnitude levels of byte data spanning a range from byte 00000000 to byte 11111111, as is provided for example by scanning a document area having a white background and various levels of grey scale image. However, and without limitation thereto, during the initialization of the scanner apparatus in accordance with the invention, the output of sensor/convertor 21 is subjected to a threshold detection procedure by slave processor 32 of FIG. 4 to insure that only two levels of binary output are provided to memory 40. With reference to FIGS. 6 and 7, the only two outputs that are provided to buffer memory 40 during initialization are a large magnitude byte such as 01010111 for all PELS within the generally white area surrounding target 54, and a lower magnitude byte such as 00011111 for all areas within target 54.

In addition, but without limitation thereto, it is preferable that in order to "find" the platen's referencing corner 58 within the data stored in memory 40 a row and column averaging procedure be used, since the stored data content of memory 40 may not define target area 54 as is ideally shown in FIG. 7.

As stated previously, the position of target means 54 relative to platen referencing corner 58 is not critical to the invention. For example, target means can be located at virtually any known position prior to the platen's leading edge 57 that is within the viewing area of CCD array 27. It is however advantageous that the Y direction edge 55 of the target means be positioned in exact mechanical alignment with the left hand edge of the transparent portion of platen 12. For example, target means 54 may be located generally to the left of this platen edge, rather than to the right thereof as is shown in FIG. 6.

Figure 8:
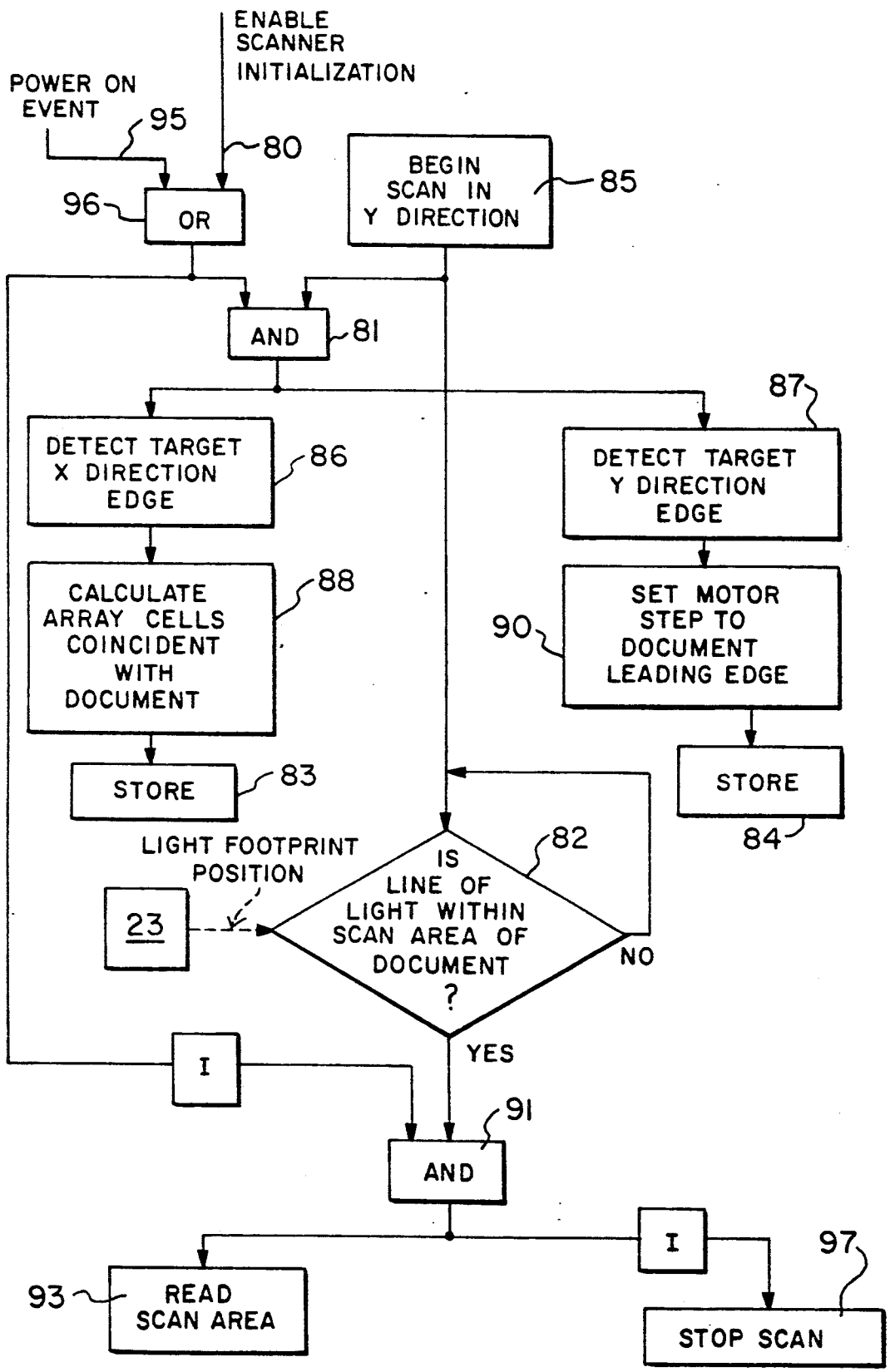

FIG. 8 will now be referenced in order to describe further embodiments of the invention. As stated previously, the scanner apparatus of the invention is periodically initialized, for example at initial power-on at the beginning of a work day as a result of an active signal being present on conductor 95, or periodically at later times and on command as a result of an active signal being present on conductor 80.

Consider first the situation where the signals on conductors 80 and 95 are both inactive at the time that a scan request (function block 85) is received. In this case, AND gate 81 remains disabled, and decision block 82 operates to monitor the position of the moving light footprint 24, for example by way of the open loop counting of the movement steps of stepping motor 18, or as may be provided in a closed loop fashion by the output of feedback transducer 23.

So long as light footprint 24 is within the area of the document that is to be scanned, AND gate 91 is enabled and operates to read the document's scan area by operation of function block 91. Reading function 93 is accomplished by activating the individual sensor cells 28 as are indicated by (1) the operation of memory store block 83 (to be described) and (2) the location of the document scan area relative to referencing corner 58 (FIG. 5). Whatever sensor cells as are activated, the cells remain active during the time interval that light footprint 24 remains within the document's scan area, as is indicated by the operation of memory store block 84 (to be described).

The distance from the position of home sensor 63 of FIGS. 5 and 6 (i.e. the position at which motor 18 stops and then restarts to begin the scan toward document/platen leading edge 57) is stored in memory by operation of function block 84. If the above assumed scan operation is a full document scan, function block 93 is activated after this distance of movement by motor 18. If the above assumed scan operation is a window scan, the distance of movement by motor 18 is related to this memory content distance plus the distance from document/platen leading edge 57 to the leading edge of the document's window, this later parameter being defined by the user, by an application program that is currently being executed, by host 45, or by the like.

Assume now that an active signal is present on either of the conductors 80 or 95, indicating the occurrence of an initial power-on event 95 such as may occur at the beginning of a work day, or indicating that a request 80 has been received to re-initialize the scanner at a later time during the work day. Either of the events 80,95 causes function block 85 to become active. At this time function block 85 becomes active not for the purpose of scanning a document, but rather for the purpose of scanning target 54 (FIGS. 5 and 6) in accordance with the invention.

As a result of the occurrence of either of the events 95 or 80, OR gate 96 issues an active signal to AND gate 81. AND gate 81 also receives an active signal at this time from function block 85. The resulting active output from AND gate 81 indicates (1) that the scanner is to be initialized, and (2) that a scan operation is beginning during which the initialization is to occur.

An active output from AND gate 81 operates to enable function blocks 86 and 87 to perform the sensing of target area 54 (i.e. sensing the position of target edges 56 and 55, respectively) as above described.

As a result of the operation of function block 86, a calculation is performed to determine exactly which of the 3,634 sensor cells within linear sensor array 27 are positioned to be coincident with the 3,400 PEL X direction width of platen 12, see function block 88. This sensor cell parameter is then stored in memory (see function block 83) for use in future document scan operations. This stored sensor cell parameter will continue to be used until such time as a reinitialize request is received on conductor 80, as is evidenced by an active signal on this conductor.

In addition, function block 87 operates to set the distance that motor 18 must move carriage 15 from home position 63 of FIGS. 5 and 6 in order to bring light footprint 24 into coincidence with the leading edge 57 of the platen/document. This distance parameter is also stored in memory, see block 84.

As will be remembered, the distance from target edge 56 to the leading edge 57 of platen 12 is a known distance. However, the location of edge 57, using the various mechanical and electrical components of scanner 10, cannot be accurately determined based upon the physical position of home sensor 59 (FIG. 1) which corresponds to the stop position labeled home sensor 63 in FIGS. 5 and 6, since, as will be appreciated by those of skill in the art, the mechanical position of home sensor 59 relative to leading edge 57 is clearly subject to variation, as with temperature change, jarring of the scanner, manufacturing tolerances, and the like.

In accordance with the invention, detection of the target's Y direction edge 55 enables accurate location of light footprint 24 relative to array 27, and detection of the target's X direction edge 56 enables accurate measurement of the position and movement of footprint 24, in order to accurately begin the sensing of document PELS when light footprint 24 is at the leading edge of the scan area, be it a full document scan or be it a document window scan.

The distance that light footprint 24 must move before an active output is received from decision block 82 is determined by the known distance from target edge 56 to platen/document leading edge 57 in the case of a full document scan request, and is based upon this distance plus the location of the window within the document in the case of a window scan request.

As is apparent from FIG. 8, during the above described initialization of the scanner, as is indicated by an active output signal from OR gate 96, AND gate 91 is maintained disabled. As a result, function block 97 operates to stop scan movement 85 after the operation of store functions 83 and 84, and to return the scan carriage to its home position, where the scan carriage awaits a later request to scan a document. This later request to scan a document will be indicated by function block 85 being active in the absence of an active output from OR gate 96.

While the preferred embodiment of the invention shown in FIG. 8 provides for an initialization scan of target 54 that is separate from document scans, within the spirit and scope of the invention the scanner apparatus may be periodically initialized, for example on power-on or at a later time on command, and the initialization may occur as the beginning portion of a document scan request.

In such an embodiment of the invention, after the mechanical position of the platen's referencing corner 58 (FIGS. 5 and 6) has been "found" relative to the position of array 27 and relative to the position of home sensor 59, and after these parameters have been stored in memory by the operation of store blocks 83,84, decision block 82 operates to monitor the position of motor 18 (i.e. the position of light footprint 24) in order to determine when the light footprint is within a requested document scan area. When a full document scan has been requested, function block 93 operates to activate the sensor cells 28, as is stored in memory by operation of store block 83, when the leading edge of the platen is encountered by the light footprint, as is indicated by distance memory store 84. When a window of the document is to be scanned, the sensor cells 28 to be activated by function block 93 are based upon the position of the scan window within the document and upon the content of distance memory store 84.

The present invention has been described in a manner to enable those skilled in the art to practice the invention. While reference has been made to preferred embodiments of the invention, in order to disclose the best mode of practicing the same, it is recognized that those skilled in the art will readily visualize yet other embodiments of the invention that are within the spirit and scope of the present invention. Thus, it is intended that the spirit and scope of the invention be limited solely by the following claims.

What is claimed is:

1. A document scanner comprising;
  a platen with a rectangular transparent area for supporting a document to be scanned;
  said platen being divided into logical portions by an orthogonal X,Y coordinate system comprising a X-axis and a Y-axis intersecting at a (0,0) origin, wherein said X-axis is defined by a transparent area first end, said Y-axis is defined by a transparent area first side, and said transparent area first end and said transparent area first side meet at a transparent area reference corner which defines said origin, said coordinate system oriented such that said transparent area is located within positive values of X and Y;
  a platen leading edge comprising the portion of said platen located in the negative-Y area of said coordinate system, said platen leading edge having a platen reflectivity;
  a platen side edge comprising the portion of said platen located in the negative-X area of said coordinate system;
  a light source providing illumination on said platen;
  optical means for focusing light reflected from said platen onto a linear array of light sensors;
  a scan line on said platen defined by a narrow linear area on said platen being sensed by said array of light sensors;
  said array of light sensors providing analog voltages corresponding to light intensities;
  analog to digital conversion means for converting said analog voltages into digital numerical values;
  memory means for storing said digital numerical values;
  movement means for relative movement between said scan line and said platen, wherein movement is orthogonal to said X-axis;
  home sensor means for approximately locating said scan line relative to said origin in the Y-direction, wherein said scan line is moved relative to said platen in the negative-Y direction until a mechanical stop position is reached, then said scan line is moved relative to said platen in the positive-Y direction until said home sensor means is reached, thereby defining a home position;
  a target located within said platen leading edge, said target having a reflectivity with a high contrast relative to said platen reflectivity, said target further comprising a target Y-direction edge parallel to said Y-axis and located a precise and known distance from said X-axis, and a target X-direction edge parallel to said X-axis and located a precise and known distance from said Y-axis;

a rectangular target area surrounding said target, said target area having a location in the Y-direction fixed relative to said home position, and having a location in the X-direction fixed relative to said array of light sensors;

said target area having a target area first side and a target area second side parallel to said X-axis and having Y-direction locations fixed relative to said home position, wherein said target X-direction edge is known to be between said target area first side and said target area second side;

said target area having a target area third side and a target area fourth side parallel to said Y-axis, said target area third side having a X-direction location optically corresponding to a first target area light sensor within said array of light sensors, said target area fourth side having a X-direction location optically corresponding to a second target area light sensor within said array of light sensors, said first target area light sensor and said second target area light sensor being fixed within said array of light sensors, and wherein said Y-axis optically corresponds to a first transparent area sensor within said array of light sensors, said first transparent area sensor being variable and known to be between said first target area light sensor and said second target area light sensor;

a first sensor group comprising a group of light sensors within said array of light sensors which is illuminated by reflected light from said target area in the X-direction whenever said scan line is within said target area in the Y-direction;

a second sensor group comprising a group of light sensors within said array of light sensors which is illuminated by reflected light from said transparent area whenever said scan line is within said transparent area in the Y-direction, said second sensor group extending in the positive X direction from said first transparent area sensor;

controller means for:
   (a) moving said scan line relative to said platen to said home position;
   (b) moving said scan line relative to said platen in the positive-Y direction through said target area;
   (c) storing in said memory means light intensities from light sensors within said first sensor group, thereby storing an image of said calibration target and part of said leading edge;
   (d) determining a target X-direction edge location within said target area and a target Y-direction edge location within said target area by determining lines of high contrast within said image;
   (e) using said target Y-direction edge location within said target area to calculate a precise Y-direction location of said scan line relative to said origin; and
   (f) using said target X-direction edge location within said target area to determine said first transparent area sensor;

whereby said origin is precisely located relative to said home position and said second sensor group is precisely located within said array of light sensors.

2. A document scanner as in claim 1 wherein said controller means also comprises means for computing a location for a portion of said document to be scanned.

3. A document scanner as in claim 2 wherein said target Y-direction edge is on said Y-axis.

4. A document scanner as in claim 3 wherein said target is substantially black and said platen leading edge has high reflectance.

5. A document scanner as in claim 4 wherein said target is rectangular.

6. A document scanner as in claim 5 wherein said platen is stationary and said scan line is moveable.

* * * * *